INVENTORS.
Arnold M. Bartz
BY Norman Wright

Edward E. Schilling
ATTORNEY

INVENTORS.
Arnold M. Bartz
BY Norman Wright

Edward E. Schilling
ATTORNEY

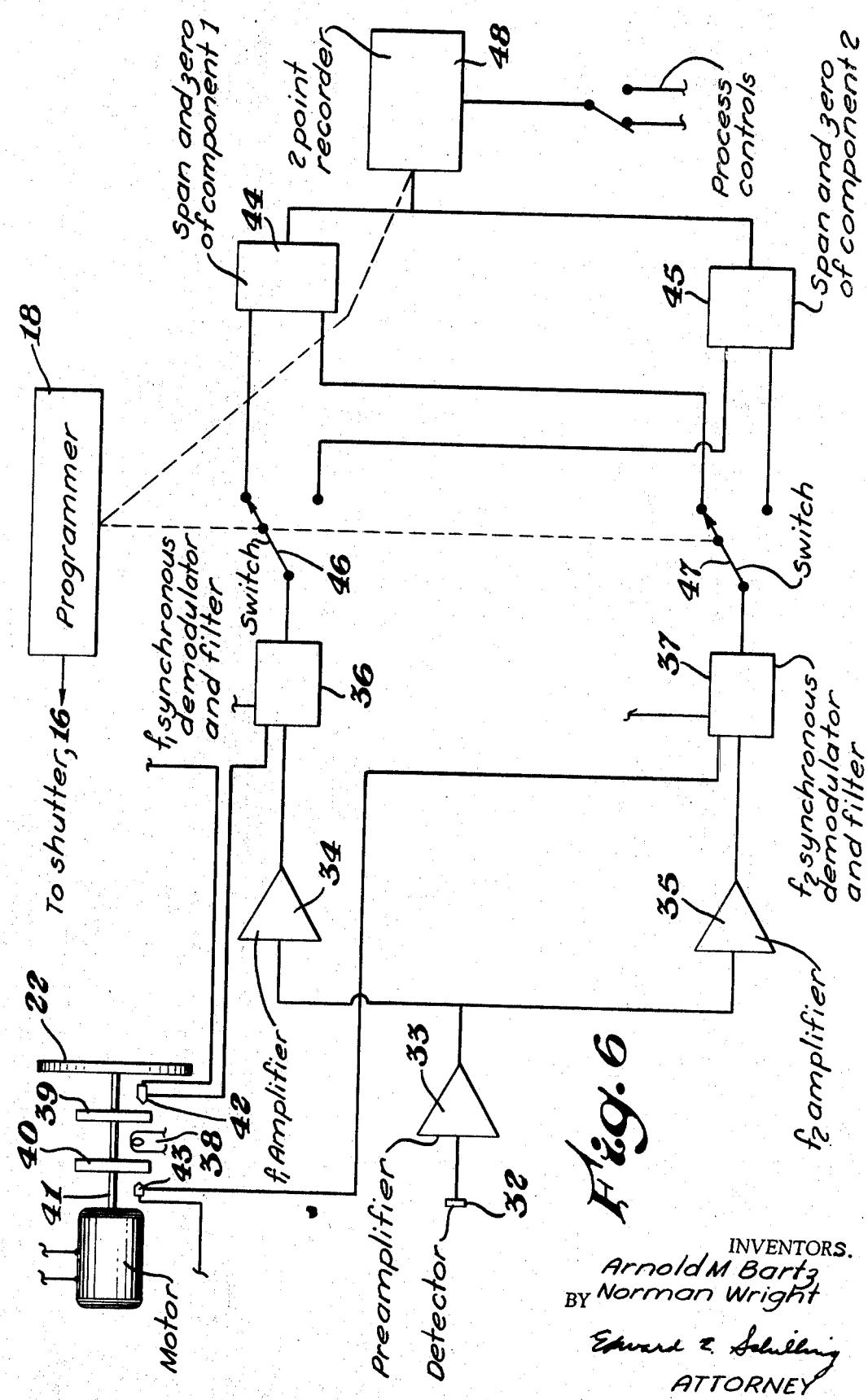

United States Patent Office 3,519,816
Patented July 7, 1970

3,519,816
STREAM ANALYZER FOR RADIATION AB-
SORPTION ANALYSIS OF A PLURALITY
OF COMPONENTS
Arnold M. Bartz and Norman Wright, Midland, Mich.,
assignors to The Dow Chemical Company, Midland,
Mich., a corporation of Delaware
Filed Oct. 5, 1966, Ser. No. 584,467
Int. Cl. G01n 21/26, 21/34
U.S. Cl. 250—43.5
9 Claims

ABSTRACT OF THE DISCLOSURE

Apparatus for the concurrent quantitative determination of a plurality of components in a single cell, such as the cell of a stream analyzer, utilizes a single source, a single detector, a monochromator having a single dispersing means as a component part and a single exit slit from the monochromator, but most importantly, a plurality of entrance slits provided with shutter means for alternately, periodically, selectively and cyclically blocking and unblocking pairs of such entrance slits, and, in addition, means for concurrently directing radiation from two unblocked entrance slits to the dispersing means from two different angles of incidence thereby passing two monochromatic bands through the monochromator, one band being selected for monitoring absorption of a sample component and the other band for monitoring background and/or interfering substances, additional means for similarly and at other times directing radiation concurrently at the dispersing means from each slit of other preselected pairs of entrance slits, respectively, means for chopping radiation passing each pair of unblocked entrance slits, each of the beams from a given pair being chopped at a different frequency, means for frequency discrimination and ratio comparison of the concurrent signals produced by the detector in response to the radiation chopped at said different frequencies, means for shifting the shutter means from entrance slit pair to entrance slit pair, means for harnessing the output of the detector, such as a chart recorder or process control devices, means for discriminating ratio comparison signals, pair by pair, from the preselected pairs of entrance slits, and means for coordinating the shifting of the appropriate harnessing means.

Figure 1:
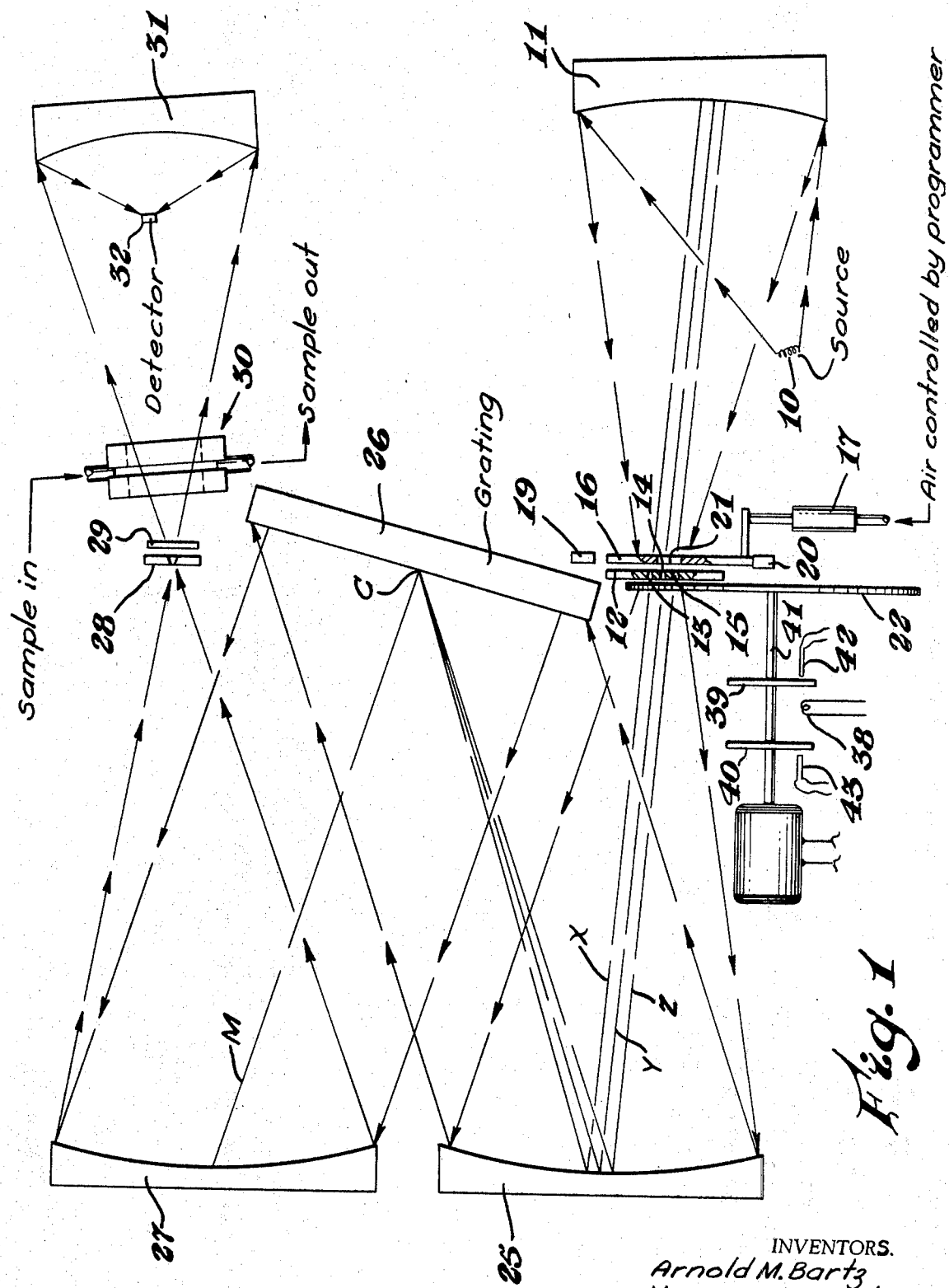

This invention relates to an apparatus for spectral analysis, photometry, and the like, of a mixture of radiation responsive substances and more particularly relates to absorption spectrometry apparatus which is especially suitable for stream analysis of a mixture, the analysis involving the quantitative determination of each of a plurality of components of the mixture by ascertaining the ratio of absorption of radiant energy at two selected wavelengths for each component. This apparatus provides means for segregating and discriminating monochromatic beams of different wavelengths from radiation from a single source, the segregated monochromatic beams being directed on a single detector after traversing a single sample cell.

For the purposes of the specification and the appended claims, the terms monochromatic radiation and monochromatic band refer to a narrow band of consecutive wavelengths not more than 50 reciprocal centimeters wide.

It is a principal object of the present invention to provide novel apparatus for the concurrent quantitative determination of a plurality of components in a single sample cell.

This and other objects and advantages of the present invention are attained by a novel assembly of parts including, in combination, a single source, a single detector, a monochromator having a single dispersing means as a component part and a single exit slit from the monochromator, but most importantly, a plurality of entrance slits provided with shutter means for periodically and cyclically blocking and unblocking pairs of such entrance slits, and, in addition, means for concurrently directing radiation from two unblocked entrance slits to the dispersing means from two different angles of incidence thereby passing two monochromatic bands through the monochromator, one band being selected for monitoring absorption of a sample component and the other band for monitoring background and/or interfering substances, additional means for similarly and at other times directing radiation concurrently at the dispersing means from each slit of other preselected pairs of entrance slits, respectively, means for chopping radiation passing each pair of unblocked entrance slits, each of the beams from a given pair being chopped at a different frequency, means for frequency discrimination and ratio comparison of the concurrent signals produced by the detector in response to the radiation chopped at said different frequencies, means for shifting the shutter means from entrance slit pair to entrance slit pair, means for harnessing the output of the detector, such as a chart recorder or process control devices, means for discriminating ratio comparison signals, pair by pair, from the preselected pairs of entrance slits, and means for coordinating the shifting of the appropriate harnessing means. The component parts and the arrangement thereof are hereinafter more fully described.

For the purposes of the specification and claims, the term monochromator refers to a combination of parts, in the optical system of a spectrophotometer, which is adapted to select and pass, from a given light beam, only a substantially monochromatic band. Although the monochromator in the present apparatus passes light at a plurality of discrete different monochromatic bands instead of the more usual single monochromatic band, it selects and passes only one monochromatic band for each entrance slit employed, the light beam in each instance traversing respectively different routes through at least part of the monochromator. Since the monochromator still acts as a monochromator toward each beam, it will be referred to hereinafter by the familiar term monochromator.

The improved apparatus includes, as indicated above, a mirror, movable shutter means and plural entrance slit means for periodically and cyclically selecting a given pair of beams of radiation from a single source. The pair of beams selected is passed through a chopper which cyclically interrupts each beam at a different frequency. At each revolution of the chopper, each beam is passed for as long an interval or intervals as is reasonably feasible, preferably for a total time equal to ½ of the time elapsed during a single revolution of the chopper. The chopper is provided with an arcuate opening or circumferentially aligned openings for each entrance slit employed. On moving a shutter having an appropriate window or windows therein, each movement of the shutter uncovers a different pair of entrance slits. The beams passing such entrance slits are interrupted by the chopper. Each pair of beams essentially includes a beam which brings a light signal to the detector at a reference wavelength or monochromatic band. Each such beam must necessarily be chopped at a different frequency than the beam transmitted at the analytical wavelength for the component being determined. By moving the shutter at intervals of from about 15 seconds to several minutes, readings for each component measured are carried out for a sustained period corresponding to the interval selected. Shorter or longer cycles may be used if desired depending upon the stability of the system being monitored and the number of components being determined.

A given pair of selected beams periodically passed by the shutter and the entrance slits and intermittently passed by the chopper is directed by collimating mirror means upon a single radiation dispersing element, such as a diffraction grating. The dispersed radiation is picked up by and reflected from a single focusing mirror along an optical path through a single exit slit.

The radiation passing the single exit slit normally passes through but a single sample cell to a condensing mirror which focuses the radiation on the detector.

The two cyclically interrupted beams fall on the detector, each at its own chopping frequency, so that the detector may be, and usually is, illuminated in part concurrently by both beams and in part alternately by at least one of the beams. The signals produced by the detector are selectively discriminated and compared in one of a plurality of selected zero and span adjust networks. Such zero and span adjust networks are well understood in the spectrometric and electronic arts. A zero and span adjust network is provided for each pair of entrance slits employed and therefore, ultimately, for each component being monitored and determined. The output from each zero and span adjust network is conveniently fed into a single multi-point recorder which obtains and indicates and records, in turn, the ratio of each pair of signals. If desired, each pair of signals can be fed to a respective single point recorder. The selection of the pair of entrance slits to be unblocked at a given time is coordinated with the selection of the appropriate zero and span adjust network according to a predetermined schedule for monitoring each component in the sample stream. The programmer provides such coordination and controls both the air cylinder which moves the shutter in front of the entrance slits and the selector switch that selects the desired zero and span adjust network.

Figure 2:
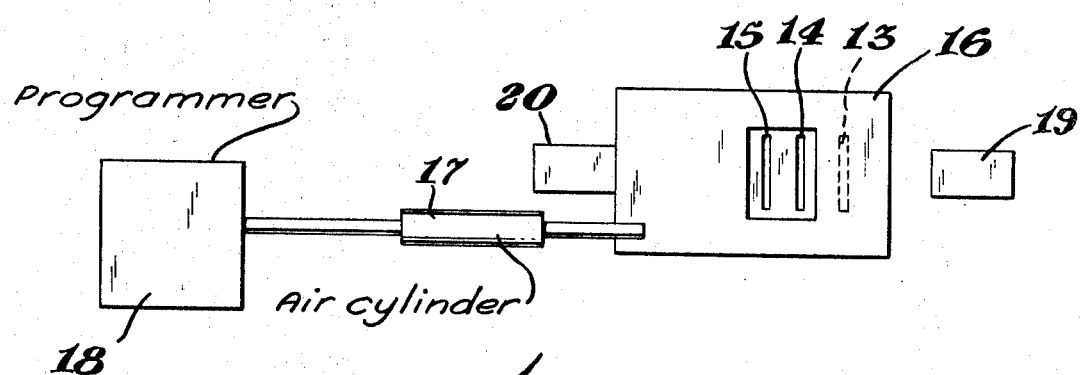
Figure 3:
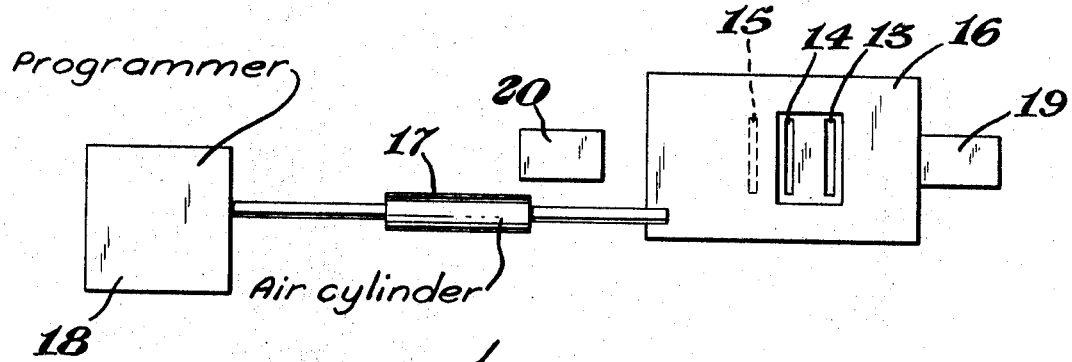
Figure 4:
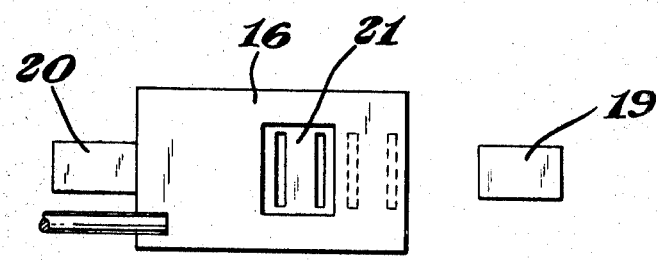
Figure 5:
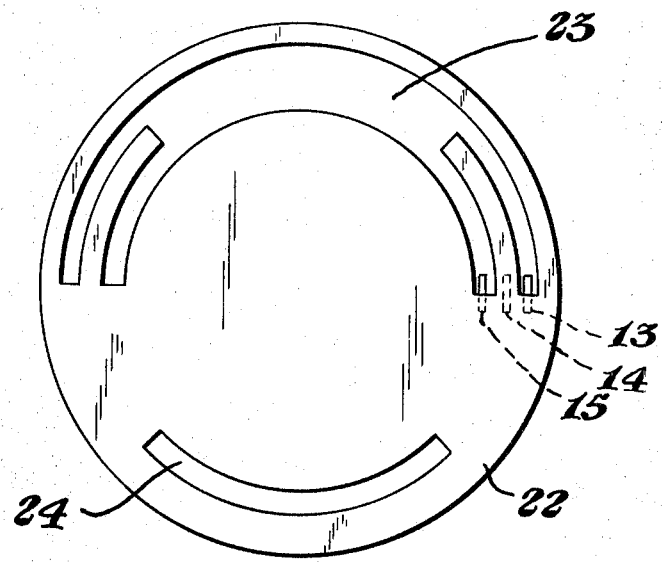
Figure 7:
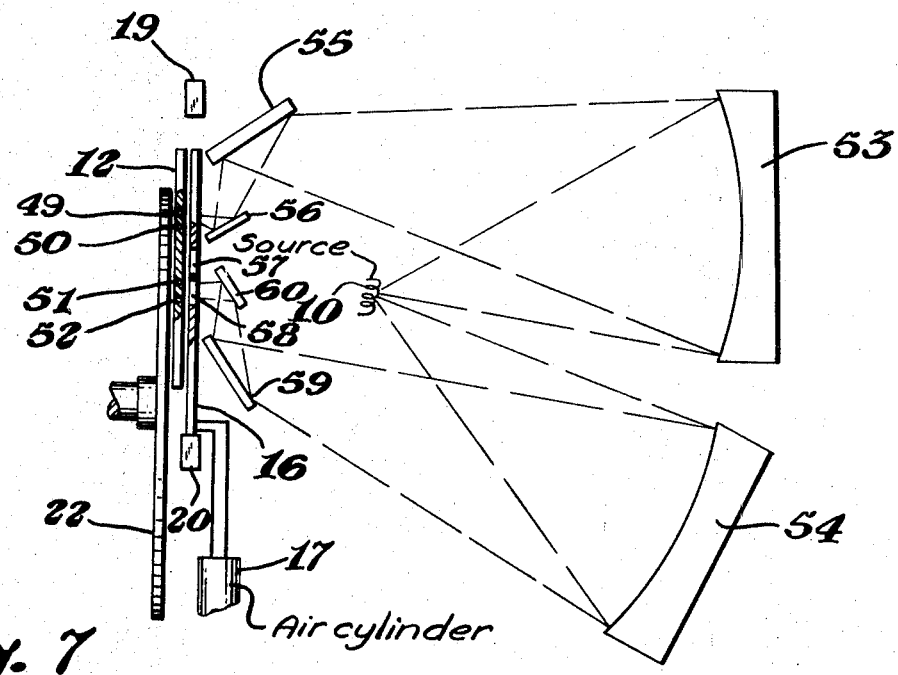

The advantages and features of the present invention will be better understood upon becoming familiar with the following description, reference being had to the appended drawings in which like numerals refer to like parts and in which:

FIG. 1 is a diagrammatic plan view of one form of the apparatus showing the radiation source, the detector, a sample cell, a set of entrance slits, a shutter, a chopper, and the optical path having a plurality of segments inside the monochromator, FIG. 2 is a diagrammatic and partly schematic view in front elevation of the shutter and entrance slits of the apparatus as well as the air cylinder actuating means therefor, FIG. 3 is a view similar to FIG. 2 but showing the shutter in an alternate position with respect to the entrance slits, FIG. 4 is a fragmentary view, similar to portions of FIGS. 2 and 3 illustrating another embodiment of the present apparatus with a larger number of entrance slits, FIG. 5 is an enlarged view in front elevation of a chopper suitably employed with the shutter and entrance slits of FIGS. 2 and 3, FIG. 6 is a schematic arrangement of parts including the detector of the present apparatus and a system for utilizing or harnessing the output of the detector, and FIG. 7 is a fragmentary portion of a plan view similar to FIG. 1, showing another embodiment of the present analyzer apparatus employing a mirror arrangement adjacent the source which permits wider spacing of entrance slits.

While an absorption spectrometer embodying the apparatus of the invention may be employed in different forms for examination of a sample by different kinds of radiation, the apparatus shown is adapted for, and will be particularly described with reference to, spectral analysis by means of infrared radiation.

The apparatus shown in FIG. 1 includes a source 10 emitting infrared radiation, including each of the wavelengths to be employed for analytical purposes. The source may be any of the kinds commonly used, e.g., Nichrome wire, a nernst glower or a piece of silicon carbide heated by the passage of electric current therethrough. Radiation from the source 10, preferably an elongated or wide source, is collected by a parabolic or spherical mirror 11 and directed upon the plate 12 in which there are formed entrance slits 13, 14, and 15, visible here because the plate 12 is shown partly broken away and in section. The radiation is focused on these entrance slits so as to illuminate each with an image of the source. Interposed between the mirror 11 and the entrance slits 13, 14 and 15 is a movable shutter 16 having a window 21 formed therethrough and visible here because the shutter 16 is shown partly broken away and in section. The window 21 is of the requisite size and aligned, as illustrated in FIG. 2, to pass radiation through a pair of the entrance slits 14 and 15 while blocking off or masking a third entrance slit 13. The shutter 16 is actuated by air cylinder 17 which is in turn operated by compressed air supplied in response to the programmer 18. The shutter 16 is generally mounted so as to be reciprocable in a horizontal direction, the limits of motion being determined by the positions of stops 19 and 20.

Referring now to FIGS. 2 and 3 in which there are shown the shutter in two positions of rest following reciprocation, it may be seen that the window 21 formed in the shutter 16 must be of the requisite size to expose two entrance slits simultaneously, for example, slits 14 and 15, while masking off the third entrance slit 13. On reciprocating the shutter to the other extreme position, the window must uncover the pair of slits 13 and 14 while masking off the third slit 15. It is apparent that stop 19, for example, as seen in FIG. 2, must be spaced sufficiently from stop 20 that the requisite amount of movement of shutter 16 can be afforded so as to achieve the proper uncovering masking.

Radiation passing the shutter 16 and the entrance slits, e.g., slits 14 and 15, falls upon the chopper 22 and is thereby intermittently interrupted at a rate of about 6 to 100 cycles per second. As may be seen with reference to the enlarged view of the chopper 22 shown in FIG. 5, the requisite interruptions are provided by opaque portions of a rotatable disc separated by circumferentially aligned arcuate openings in the disc. The dual-legged arcuate opening or void space 23 shown provides contiguous void spaces for the passage of radiation from each of the entrance slits while the arcuate opening 24 provides for additional passage and interruption of radiation passing the middle entrance slit 14.

Referring again to FIG. 1 it may be seen that light passing the entrance slit, shutter and chopper combination falls upon the collimating mirror 25 and is directed onto the single dispersing means 26. The dispersing means 26 shown is a diffraction grating although a prism made of appropriate material, such as a crystal of NaCl, may be used if desired with appropriate alterations in the geometry of the apparatus. Diffracted radiation leaving the dispersing means 26 falls at least in part upon a parabolic mirror 27 which in turn focuses the incident radiation upon the single exit slit 28. Radiation leaving the exit slit 28 is preferably passed through an optical filter 29 to filter out undesired radiation, e.g., higher order radiation arising when a diffraction grating is used. Light passed by the optical filter is directed through a sample cell 30 whereupon the radiation falls on a condensing mirror 31 and is finally concentrated upon the detector 32.

The sample cell 30 may be any suitable device for holding a gas or liquid, i.e., a fluid, solution sample which is to be subjected to spectral analysis. Since the apparatus is primarily designed for stream analysis work, the cell will usually be provided with an inlet and an outlet so that a stream of sample to be analyzed may flow through the cell. The cell is necessarily provided with windows that will transmit radiation in the wavelength region used for the analysis. For example, sodium chloride, silver chloride or calcium fluoride windows are frequently used in infrared work. The cell also must present a sufficiently unrestricted opening to the optical path so as not to constrict or diffract the beam of radiation passing therethrough.

The sample cell may be positioned, if desired, along the optical path at other locations than the one specifically illustrated in the drawing. Thus, if the sample cell construction and size permit, the cell may be located at any place where both beams follow a common path and are sufficiently focused or condensed to pass through cell windows and apertures of reasonable size as employed in the art. The position shown in the drawing is generally to be preferred because substantially only monochromatic radiation reaches the cell in this location, especially in analyzing liquid samples as liquid samples are heated less by monochromatic radiation than by an undispersed beam and there is less tendency either for the solvent to boil or for density changes to take place in the sample.

If desired, the transmission cell described above may be replaced by a reflectance cell using the attenuated total reflectance principle, providing appropriate and obvious changes in apparatus geometry are made in the arrangement of parts beyond the sample cell in order to bring the reflected signal to the detector.

A radiation signal passing through entrance slit 14 is directed upon collimating mirror 25 at a slightly different angle than a radiation signal passing entrance slit 15. As a consequence the radiation reaching the dispersing means 26 is also incident thereon at different angles depending upon the entrance slit traversed. As a still further consequence the focusing mirror 27 is illuminated with a somewhat shifted spectrum when radiation is received from entrance slit 15 compared to entrance slit 14. As an even further and more exaggerated result, the exit slit 28 is illuminated with and passes or selects distinctly differing parts of the same spectrum when radiation from entrance slit 15 falls thereon as compared to radiation from entrance slit 14. Thus it may be seen that two distinctly differing and discrete portions of the spectrum of the radiation produced by the single source 10 are finally brought to bear upon the detector 32.

In order for beams of radiation passing a pair of entrance slits and reflecting from a common collimating mirror to the dispersing means to strike the dispersing means at respectively different angles of incidence, it is necessary that each beam traverse at least a slightly different path from entrance slit to dispersing means. Referring more particularly to FIG. 1, it is seen that the centerlines X, Y, Z sketched in for beams from entrance slits 13, 14 and 15, respectively, fall on collimating mirror 25 at displaced locations and come together at the dispersing means or grating 26 thus reaching, by different paths, a common location as indicated by centerline C. Note, however, that the diffracted beams reaching mirror 27, in such a manner as to be focused on the exit slit 28, are of respectively differing wavelengths although the beams are each parallel and coincident and fill the mirror 27. The centerline of the mirror 27, indicated by the letter M, is common to each beam focused on the exit slit 28.

In using the present apparatus the entrance slit 14 will be positioned in the plate 12 so as to provide for passage of radiation at a reference wavelength suitable for use with each of the analytical wavelengths determined by the positioning of entrance slits 13 and 15. Each of entrance slits 13 and 15 will be positioned so as to pass radiation at a suitable analytical wavelength for two differing components of the sample mixture passing through sample cell 30.

The utilization of the signal arising at the detector 32 as a consequence of radiation passing the monochromator and sample cell and falling on the detector is more fully understood with reference to FIG. 6.

The consequence of chopped beams of radiation falling concurrently on the detector according to the present invention is a signal consisting of partly concurrent, partly overlapping and partly discrete alternating current type signals which are superimposed, but of two differing frequencies. The composite signal produce by such superimposition is first fed to a pre-amplifier 33, a first stage amplifier normally placed very close to the detector 32. After initial amplification, the superimposed signals are fed to parallel amplifier units 34, 35, each containing, respectively, a narrow frequency electric band pass filter which will pass one of the superimposed signals but not the other. Thus, for example, the electric band pass filter $f_1$ in the apparatus as shown might pass the higher frequency signal arising from a higher frequency of chopping while the filter $f_2$ would then be one selected to pass the lower frequency signal. In each amplifier the incoming signal is first directed to the narrow band pass filter. The signal passing the band pass filter is amplified through several stages of amplification before being directed to one of the respective rectification elements 36, 37, each containing a switch followed by an electrical filter. As shown, the signal from amplifier 34 is directed to rectification element 36 while the signal from the amplifier 35 is directed to the rectification element 37.

Synchronous rectification takes place within the conventional rectification elements 36, 37 also known as synchronous demodulators, which are designed to effect full wave rectification. In each rectification element, a quick-acting switch converts the alternating current-type signal, selected from the mixed alternating current signals arising from the detector, into a series of halfwaves. The rectified signals are then filtered to remove the remaining "ripple."

Synchronization may be carried out in any suitable manner, e.g., the switches passing the amplifier output may be controlled by a relay circuit which is energized by means of switches actuated by cams associated with the chopper means on the shaft on which the chopper is mounted. The cam-actuated switches must be arranged, respectively, to each rectify one signal. One switch would thus operate at a given $f_1$ frequency to carry the signal of $f_1$ frequency while the other switch at a given $f_2$ frequency operates to carry the signal of $f_2$ frequency.

A preferred means of accomplishing synchronous switching is to control each quick-acting switch by means of a relay circuit, the current impulses in which arise from a photodiode. Each photodiode is positioned on the opposite side of a chopper from a light source such as a small tungsten lamp and becomes conductive of impressed current only when illuminated. The relatively weak impulses passed by the photodiode are magnified by a Schmitt trigger, sometimes known as a "flip-flop" switch. Such switch is usually bodily incorporated within the housing for the synchronous demodulator. The magnified impulses are used to actuate the quick-acting switch which, as indicated above, reverses polarity at the appropriate frequency to pass and rectify the signal of the desired frequency. Each switch, being a synchronous rectifier driven at the precise signal frequency, discriminates against signals of all other frequencies, since the direct current value of the parts of signals of other frequencies passing the switch would tend to average zero.

In the embodiment of the present apparatus shown in FIG. 6, tungsten lamp 38 is positioned between supplemental choppers 39, 40, mounted on the motor shaft 41 supporting chopper 22. These supplemental choppers are employed solely for the generation of electrical signals which control synchronous demodulation. The lamp 38 illuminates photodiodes 42, 43, respectively, each time an open sector in either supplemental chopper 39, 40, passes the respective photodiode. Impulses transmitted by the photodiode 42 are directed to the synchronous demodulator 35 where the impulse is magnified by the Schmitt trigger housed therein and the magnified impulse is used to control the switch within the rectification element. The supplemental chopper 39 is provided with an open sector having the same degrees of arc as the sectors in the annular portions of chopper 22 which give rise to the $f_1$ frequency radiation signal. The other supplemental chopper 40 is provided with open sectors of the same degrees of arc as the sector in the annular portion of the chopper 22 which gives rise to radiation signals at the $f_2$ frequency. The two choppers 39, 40, are precisely aligned so that the impulses of the respective photodiodes 42, 43, cause the switches in the demodulator elements 36, 37, to operate in phase with the respective signals arriving from the amplifier units 34, 35.

Any other suitable means for cyclically illuminating the photodiodes 42, 43, may be used if desired. Thus both lamp and photodiode combinations may be disposed in association with the regular chopper 22 or two supplemental choppers similar to those shown disposed on the motor shaft 41 may be disposed on any other shaft or shafts driven synchronously with motor shaft 41. Each separate chopper may be designed to intermittently and regularly pass light from a tungsten lamp or other suitable light source to the corresponding photodiode at the respective required frequency.

The direct current signals constituting the output of each demodulator, each signal having its own magnitude, are separately directed from the demodulators 36, 37, to one of two conventional span and zero adjust network units 44, 45. Switches 46, 47, determine the span and zero adjust network unit employed. As shown in FIG. 6, the span and zero adjust network 44 is in the circuit. With such a system, the two direct current signals are compared and balanced electrically in a potentiometer circuit having a movable slide wire contact, and the movement of the contact by means of a servo system, in order to effect a balance, is recorded by a two point pen recorder 48 and/or used to operate a process controller unit, e.g., a unit such as a valve controlling flow of reactants, or, a variable resistance element controlling reactor temperatures. If desired, the recorder 48 may be a single pen recorder instead of a two point recorder. If the single pen recorder is used, it is desirable to provide a demarcation means to indicate a change in the sample component being monitored.

A highly important aspect of the present invention is the use of a programmer 18 to accomplish time sharing of the entire apparatus for the analysis of each of the components being monitored and measured. The programmer, in effect, makes the present apparatus, for process control purposes, the equivalent, substantially, of as many individual stream analyzers as there are individual components being determined. The programmer 18 provides for synchronous operation of each of (1) the shutter 16, (2) switches 46 and 47, and (3) the pen controls and/or output controls of the recorder 48. After a short period of operation, such as, from 15 seconds to several minutes, during which time the apparatus is set to monitor and determine the concentration of a first sample component, the programmer provides for reciprocation of the shutter to an alternate position, with concurrent operation of switches 46 and 47 so as to direct the direct current signals from the demodulators to the second span and zero adjust network 45 which has been set up and adjusted full scale for measurements of a second sample component. Concurrent switching mechanisms within the two point recorder provide for the respective recording of the output of the span and zero adjust network unit 45 instead of unit 44. After the requisite period of time for appropriate analysis and recording of the concentration of the second sample component, e.g., a time period of about 15 seconds to several minutes, the programmer provides for all the concurrent changes to place the apparatus in condition again for the analysis of the first sample component, with or without a time delay during which no analysis need be carried out. The operation thus provides for cyclically carrying out the analysis of both of the sample components being monitored. If desired the output of the span and zero adjust network units 44, 45, as controlled by the programmer 18, may be further employed selectively in the operation of one or more process control units.

The operation of the shutter 16 may be carried out in any suitable manner, e.g., by electrical, hydraulic or pneumatic actuating means controlled by the programmer 18. A convenient and suitable means, as shown, employs a pneumatic system in which the air cylinder 17, controlled by the programmer 18, and having a spring return, reciprocates the shutter 16. Likewise the switches 46 and 47 and the switching mechanisms within the two point recorder 48 are controlled in any suitable manner by the programmer 18, usually electrically using a relay circuit.

In other embodiments according to the present invention there may be employed if desired, or necessary, an entrance slit plate 12 having a greater number of entrance slits formed therethrough. Thus it may be desired to use one reference wavelength for each analytical wavelength rather than employing a common reference wavelength as indicated by the single reference slit in the entrance slit plate 12 as shown in FIGS. 1, 2 and 3. It may also be desirable to provide sufficient entrance slits for the cyclic analysis of three or four components, although the programming becomes considerably more complex when three or more components are to be selectively monitored.

An entrance slit plate having four entrance slits formed therethrough is illustrated in the fragmentary view in FIG. 4. It is essential in using the apparatus shown in FIG. 4 that the shutter be made and disposed so as to uncover the appropriate pair of reference slits and sample slits at each reciprocal movement of the shutter. Thus it is obvious that the use of two shutter windows would accommodate the use of non-adjacent pairs of slits. Preferably, the pair of slits employed simultaneously are adjacent slits.

In another embodiment of the present invention there may be employed a different arrangement of mirrors adjacent the source to provide for bringing radiation more appropriately from the source to entrance slits in the event such slits are spaced relatively far apart. Such an arrangement is shown in the fragmentary view of FIG. 7. In FIG. 7 there is shown a portion of a plan view which is similar to FIG. 1 except for the mirror arrangements and the disposition and number of entrance slits employed. The entrance slit plate 12 as shown in FIG. 7 is provided with a pair of entrance slits 49, 50, positioned relatively far apart from another pair of entrance slits 51, 52, so that it is not readily feasible to illumniate each entrance slit by means of a single mirror reflecting light from the source 10. The apparatus as shown is provided with two collecting mirrors 53, 54. Mirror 53 collects radiation from the source 10 and directs the radiation to plane mirror 55 and thence to plane mirror 56. Radiation leaving plane mirror 56 is appropriately directed to pass through entrance slits 49 and 50 in a desired manner and direction when the shutter 16 has been reciprocated so that window 57 exposes the entrance slits 49, 50. The shutter 16 is also provided with a second window 58 so that radiation collected from the source by mirror 54 and directed successively to plane mirror 59 and then plane mirror 60 is brought to entrance slits 51 and 52 via the said shutter window 58.

It will be apparent from viewing the drawings and studying the foregoing description that many combinations of entrance slit locations and numbers of shutter windows and the positions thereof may be provided to facilitate analyses in which it is desired to monitor any of a variety of individual monochromatic bands. All such possible permutations are to be considered within the scope of the present invention. For example, wherein either the reference wavelength or the analytical wavelength for a first component, but not both, are disposed between the reference wavelength and analytical wavelength for a second component, it will be necessary to provide two relatively narrow windows in the shutter properly positioned laterally so as to expose the appropriate pair of entrance slits in the desired time sequence.

While the movable shutter 16 as shown in FIG. 1 may be interposed between the mirror 11 and the plate 12 having the entrance slits therein, the shutter 16 may also be located behind the plate 12, with respect to radiation from the mirror 11, so as to block or pass radiation that has passed through the entrance slits. The chopper 22 also may be relocated in front of the slit-shutter combination.

The chopper 22 is constructed with arcuate openings for intermittently passing radiation received through each entrance slit, one opening or series of circumferentally aligned openings for each slit. The number of openings operating in conjunction with a given slit is a matter of choice and dictates the discriminating frequency employed.

The chopper 22 and the synchronous demodulators and filters 36, 37, shown in FIGS. 5 and 6, respectively, have been particularly selected to accommodate a system with just two synchronous demodulator and filter units. The chopper shown is provided with arcuate openings which provide a common signal frequency for both component signals, and but a single different signal frequency for the common reference measurement. Thus the two synchronous demodulator and filter units can be selected to accommodate both parts of the cycle, i.e., the part for measuring the first component as well as the part for measuring the second component.

If desired, the chopper 22 may be constructed so as to chop radiation passing x number of entrance slits at from two to x frequencies, but there must be provided a synchronous demodulator and filter unit for each frequency. In addition, the programmer would have to be provided with controllable switch means for bringing the appropriate pair of synchronous demodulator and filter units into the electrical circuit at appropriate times during each cycle. Since the shutter can be constructed to effectively discriminate beams from differing entrance slits and frequency discrimination need be employed only with the reference and component signals of a given pair of beams, it is generally more practical to chop each reference beam at one selected frequency and each component at a second single selected frequency.

In using the present instrument for a given analysis, the instrument is set up and adjusted, semipermanently, with appropriate positioning of entrance slits so as to select substantially monochromatic radiation at each reference wavelength and analytical wavelength employed. Each wavelength adjustment is made by changing the positions of the appropriate entrance slit as well as the positions of the collimating mirror and dispersing means, as required, thereby changing the angle of incidence at which the passed beam falls on the dispersing means. As a consequence of the changes and adjustments, a different selected portion of the spectrum of the beam passing each entrance slit illuminates the single exit slit and is passed to the detector. Ordinarily, the entrance slit used in measuring one of the components is adjusted so as to select radiation at a suitable measuring wavelength in an absorption peak which often consists of the concurrent absorption by the substance to be measured and a second absorption due to either or both of an interfering absorber or general background, while the entrance slit used for reference purposes is adjusted so as to select radiation at a reference wavelength at which absorption due to the interfering absorber or background takes place substantially free of absorption due to the component. As a further consideration, the reference wavelength is selected at a location at which the interference and/or background absorb radiation to substantially the same extent as at the analytical wavelength for the component. Because of black body radiation behavior by the source, it is highly desirable to select a reference wavelength relatively close, e.g., within about 0.5 micron, to the component wavelength, especially when using wavelengths in the range of about 2 to 6 microns. The same considerations are used in positioning the entrance slit for the determination of a second component as well as an additional slit for monitoring, concomitantly, at a different reference wavlength, if needed.

As an example of the use of the instrument of the invention for the determination of components in styrene monomer, one entrance slit is positioned so as to select monochromatic infrared radiation at 3.475 microns for the determination of ethylbenzene, while a second entrance slit is positioned so as to select monochromatic infrared radiation at a wavelength of 4.484 microns for the measurement of vinylcyanide (acrylonitrile). An entrance slit is positioned for reference purposes to select monochromatic infrared radiation at a wavelength of 3.900 microns, which is an acceptable reference wavelength for the determination of each of ethylbenzene and vinylcyanide. This particular selection of wavelengths permits the use of a single slit for reference purposes which is positioned between the sample component slits. The use of a single slit simplifies the ready blocking and unblocking, by means of the shutter, of the appropriate pair of slits at the appropriate times in each cycle. Reciprocation of the shutter at 30 second intervals provides for reliable and accurate measurement of each of ethylbenzene and vinylcyanide in a stream of styrene monomer.

It will be understood that while the instrument shown is intended for use in the infrared field and the collimating and focusing elements are front surface mirrors and the dispersing means or element is preferably a diffraction grating, the instrument may be readily employed with visible and ultra violet radiation. For use in the visible field, the collimating, focusing and dispersing elements may be front surface mirrors or glass lenses. For the use in the ultra violet field, the collimating, focusing, and dispersing elements may be front surface mirrors or quartz lenses. For use in the infrared field an appropriate salt prism may be used as dispersing element in place of a diffraction grating, if desired. The detector and the source used will depend on the kind of radiation employed, as is well understood in the art.

Among the advantages of the present apparatus is the sturdiness and reliability achieved on moving noncritical parts instead of critical parts such as entrance slits or the dispersion means. Very slight errors in positioning such critical parts affects the wavelength band transmitted quite significantly.

The apparatus of the invention having been thus fully described, various modifications thereof will at once be apparent to those skilled in the art and the scope of the invention is to be considered limited only by the breadth of the claims hereafter appended.

We claim:

1. The stream analyzer for the quantitative analysis of a plurality of components which comprises:
   a light source;
   a light detector;
   means for directing a light signal from the source to the detector via a sample cell, said means comprising mirror means for illuminating at least three entrance slits, including at least one reference slit selectively passing a light signal to a monochromator which exits said light signal to said detector at one preselected reference wave length per said at least one reference slit, and the balance of the slits being component slits selectively passing light signals to said monochromator which exits each such light signal to said detector at a sample component wave length;

each portion of light signal from the source which is directed so as to pass a reference slit being referred to as a reference signal and each portion of such light signal which is directed so as to pass a component slit being referred to as a component signal;

rotating chopper means having the requisite number and spacings of arcuate openings therein to interrupt each said reference signal at a different frequency than said component signals;

a monochromator adapted to receive the light signals from said reference and component entrance slits and to exit all the light signals from a single exit slit onto mirror means which directs the exiting light signals to said detector;

and, shutter means for periodically and cyclically blocking and unblocking the path of light signals passing a first component slit and from zero to one reference slit while simultaneously unblocking and blocking a second component slit and from zero to one reference slit, but at least one component slit and one reference slit being unblocked during a part of each cycle.

2. The stream analyzer as in claim 1 in which there are two component slits and two reference slits.

3. The stream analyzer as in claim 1 in which there are two component slits and only one reference slit.

4. In a stream analyzer containing means for the segregation of monochromatic beams, differing in wave length, from radiation from a single source, said stream analyzer having a single sample cell and a single exit slit, a single detector, and single means for harnessing the output of the detector, said stream analyzer having means for concurrently directing radiations from the single source upon a single dispersing means at two different angles of incidence, said stream analyzer having means for chopping, at respectively different frequencies, the radiation directed at the two different angles of incidence, the radiations directed at the two different angles of incidence transversing two respectively different paths to the single dispersing means, and the radiation in each path transversing a different entrance slit respectively, the improvement which comprises:

additional means for directing radiations from the single source to the single dispersing means at at least one additional different angle of incidence along a path unique to such angle of incidence, each such path being through an additional entrance slit;

means for chopping the radiation directed at the additional different angle of incidence at a useful, discriminatory frequency;

shutter means for periodically, alternately, cyclically and selectively blocking and unblocking preselected pairs of said entrance slits, each said pair including one slit which passes radiation along a path to the detector at a reference wave length and the other slit being one which passes radiation along a path to the detector at a component wave length;

additional means for harnessing the output of the detector;

and means for coordinating the shutter means with each of (1) the single means for harnessing and (2) the additional harnessing means;

said improvement being further characterized as providing for periodical and cyclical spectrophotometric analysis of a plurality of individual components appearing in a single sample cell each individual analysis being based on measurement of optical density at each of a component wave length and a reference wave length.

5. The stream analyzer as in claim 4 in which the monochromatic beams segregated are in the infrared region.

6. The stream analyzer as in claim 4 in which the means for harnessing the output of the detector is a recorder.

7. The stream analyzer as in claim 4 in which the means for harnessing the output of the detector is a process control device actuated by the said output of the detector.

8. The stream analyzer as in claim 4 in which the means for periodically and cyclically selecting preselected pairs of differing angles of incidence comprises:

a plurality of entrance slits positioned in closed-spaced substantially side-by-side linear relationship transverse to the incident beam of radiation falling thereon;

a reciprocable opaque shutter having at least one window formed therethrough, said shutter being positioned so as to expose a first preselected pair of entrance slits to incident radiation passing through said window, said shutter being interposed between said entrance slits and incident radiation from the source;

and controllable means for reciprocating said shutter from side to side so as to periodically expose at least one additional preselected pair of said entrance slits, said controllable means being coordinated with said means for harnessing the output of the detector.

9. The stream analyzer as in claim 8 in which the controllable means is an air cylinder.

References Cited

UNITED STATES PATENTS

| | | | |
|---|---|---|---|
| 2,439,373 | 4/1948 | Stearns | 88—14 X |
| 2,930,893 | 3/1960 | Carpenter et al. | 250—43.5 |
| 3,279,308 | 10/1966 | Bartz et al. | 88—14 |
| 3,364,351 | 1/1968 | Palmer et al. | 250—43.5 |

WILLIAM F. LINDQUIST, Primary Examiner

U.S. Cl. X.R.

356—51, 95